Figure 1:
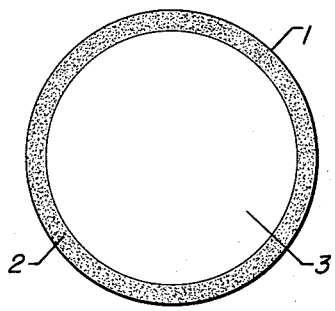

July 5, 1966  E. MICHALKO  3,259,589
PREPARATION OF CATALYST FOR THE TREATMENT
OF COMBUSTIBLE WASTE PRODUCTS
Filed April 20, 1962  9 Sheets-Sheet 1

INVENTOR:
Edward Michalko

BY:
Chester J. Giuliani
James R. Hoatson Jr.
ATTORNEYS

INVENTOR:
Edward Michalko

July 5, 1966  E. MICHALKO  3,259,589
PREPARATION OF CATALYST FOR THE TREATMENT
OF COMBUSTIBLE WASTE PRODUCTS
Filed April 20, 1962  9 Sheets-Sheet 9

INVENTOR:
Edward Michalko
ATTORNEYS

United States Patent Office 3,259,589
Patented July 5, 1966

3,259,589
PREPARATION OF CATALYST FOR THE TREATMENT OF COMBUSTIBLE WASTE PRODUCTS
Edward Michalko, Chicago, Ill., assignor to Universal Oil Products Company, Des Plaines, Ill., a corporation of Delaware
Filed Apr. 20, 1962, Ser. No. 189,101
7 Claims. (Cl. 252—466)

In broad scope, the present invention relates to the treatment of combustible waste products, containing pollutants having noxious characteristics, prior to discharging the same into the atmosphere, and more particularly involves the preparation of a catalytic composite having a novel physical structure heretofore not obtained. The process of using such catalyst, having particular characteristics, in the conversion of gaseous, combustible waste products of a noxious nature, into innocuous components for the primary purpose of eliminating the adverse effects exhibited by such waste products upon the atmosphere, is the subject of my divisional application Serial No. 304,381 filed August 26, 1963.

The catalytic composite encompassed by the present invention is especially adaptable to the elimination of the products of incomplete combustion from the hydrocarbonaceous exhaust gases emanating from an internal combustion engine, prior to effecting the discharge of such hydrocarbonaceous exhaust gases into the atmosphere.

The desirability and importance of effecting the removal of noxious components from automotive exhaust gases, or the conversion thereof into innocuous components, has recently been recognized. The incomplete combustion of hydrocarbon fuels by the gasoline, or diesel engine results in the generation of substantial quantities of unburned hydrocarbons, and other undesirable products, which, while being of a noxious nature, discharge into the atmosphere through the exhaust line as gaseous waste material. With the ever-increasing concentration of automobiles, particularly in the more densely populated urban areas, the discharge of deleterious, noxious matter into the atmosphere rapidly attains significantly detrimental proportions. Under the influence of sunlight, it is believed that these undesirable products of incomplete combustion react with atmospheric oxygen to produce a dense, polluted atmosphere now commonly referred to as smog. Such undesirable hydrocarbonaceous combustion products include, for example, unsaturated hydrocarbons, particularly oxidized hydrocarbons such as alcohols, ketones, aldehydes, and acids, etc., carbon monoxide, and various oxides of nitrogen and sulfur. At least one State, California, has passed legislation recognizing the inherent danger to the public health and welfare as such noxious gaseous material continue to be discharged into the atmosphere, and, in this regard, has appropriately instituted a Motor Vehicle Pollution Control Board having as its primary purpose the elimination, or conversion of these noxious components.

The discharge of noxious products of incomplete combustion, emanating from internal combustion engines, is but one source of pollution of the atmosphere. Although described with particular reference to the catalytic conversion, or elimination, of such noxious exhaust gases, the present invention will be found readily adaptable, by those skilled within the art, for utilization in conjunction with diesel engines, butane engines, natural gas engines, and the like. Other examples of the discharge of deleterious gaseous waste material into the atmosphere include the waste gases from stationary units such as large internal combustion engines for driving pumps, compressors and generators, waste-heat boilers, and flue-gas power recovery units, etc. The use of the present invention is advantageous in removing deleterious contaminating components from waste products characterized by the fumes exhausted from a variety of industrial operations including the printing industry, the tanning industry, and various heavy chemical industries. For example, in the printing industry, a variety of inks, dyes, and the like, contain hydrocarbons and other chemical compounds, which, either in the same or modified form, accumulate within the surroundings and are vented into the atmosphere by blowers, fans, etc. An example of the chemical process and industry, to which the present invention is suitably well adapted, is the process involved in the manufacture of phthalic anhydride. Thus, although particularly directed toward the conversion of a hydrocarbonaceous combustible mixture emanating from an internal combustion engine, the present invention affords a method for treating a variety of noxious, gaseous waste products for the purpose of decreasing the deleterious effect which is otherwise encountered by discharging such noxious waste products into the atmosphere.

The primary object of the present invention is, therefore, to provide a method for the catalytic treatment, and the catalyst for use therein, of noxious, combustible gaseous waste products for the purpose of eliminating the noxious material and/or converting the same into innocuous components. A related object is to produce a catalytic composite having a novel physical structure and the propensity for effecting the conversion of a hydrocarbon-containing mixture, as well as the capability to effect such conversion for a prolonged period of time.

Another broad embodiment of the present invention involves a method of preparing a catalytic composite which comprises commingling an inorganic oxide carrier material with a catalytically active metallic component and from about 0.1% to about 1.5% by weight, based upon the weight of said carrier material, of an organic acid selected from the group consisting of dibasic acids and derivatives thereof, having the following structural formula:

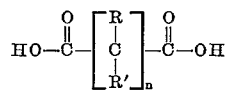

where:
R is selected from hydrogen, hydroxyl and alkyl groups;
R' is selected from hydrogen, alkyl and carboxyl groups;
and
$n$ is within the range of 0 to 6.

A more specific embodiment of the present invention affords a method of preparing a catalytic composite of alumina and a platinum component, which method comprises commingling said alumina with chloroplatinic acid and from about 0.13% to about 0.70% by weight, based upon the weight of said alumina, of an organic acid selected from the group consisting of dibasic acids and derivatives thereof, having the following structural formula:

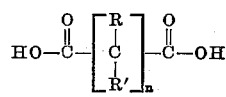

where:
R is selected from hydrogen, hydroxyl and alkyl groups;
R' is selected from hydrogen, alkyl and carboxyl groups;
and
$n$ is within the range of 0–6, drying the resulting mixture at a temperature within the range of from about 100° F. to about 250° F., and thereafter subjecting the mixture to an atmosphere of hydrogen at a temperature within the range of from about 900° F. to about 1800° F.

Another limited embodiment of the present invention involves a method for eliminating hydrocarbons from gases containing the same which comprises contacting said gases, at conversion conditions, with a catalytic composite of alumina and a platinum component, said catalytic composite being prepared by initially commingling said alumina with a platinum-containing compound and from about 0.13% to about 0.70% by weight, based upon the weight of said alumina, of an organic acid selected from the group consisting of dibasic acids and derivatives thereof, having the following structural formula:

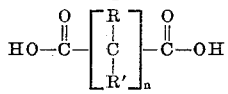

where:
R is selected from hydrogen, hydroxyl and alkyl groups;
R' is selected from hydrogen, alkyl and carboxyl groups; and
n is within the range of 0–6.

As hereinbefore set forth, the method of the present invention involves the catalytic treatment of noxious, gaseous combustible waste products prior to discharging the same into the atmosphere. The catalytic composite for use therein, hereinafter described in detail, may be placed in any suitable container, or catalytic convertor, and installed within the exhaust line in such a manner that the gaseous waste products are passed therethrough. The catalytic convertor may be of the through-flow, cross-flow, or radial-flow design, and, when utilized in the conversion of the noxious components emanating from an internal combustion engine, may either supplant, or be combined with the common acoustic muffler. Combustion air is injected ahead of the convertor inlet, usually by an aspirator or suitable external compressive means, and the waste products, together with air, are passed through the catalyst in either upward or downward flow, cross-flow or radial-flow. When employed in other applications, such as the treatment of the gaseous waste products from the printing, tanning and petrochemical industries, the catalytic composite may be conveniently disposed as a fixed-bed within the stack, or other outlet ducts, of a suitable combustion chamber, the combustion products and air being passed in admixture into contact with the catalyst prior to being discharged into the atmosphere. The precise physical structure of the catalytic convertor, the means for introducing combustion air, and the disposition of the catalytic composite within the convertor are dependent to a large extent upon the application and the function to be served.

A wide variety of factors affect the stability of active catalytic composites, and are generally peculiar to the environment in which the catalyst is employed. For example, an automotive internal combustion engine is commonly operated over a wide range of speed and load conditions including idling, cruising, accelerating and decelerating, and, therefore, the combustion efficiency of such an engine is varied considerably. The space velocity and temperature of the manifold exhaust gases, as well as the concentration of combustible material therein, will similarly vary over relatively wide limits. Therefore, when applied to the treatment of the noxious exhaust gases from an automotive internal combustion engine, the catalyst must necessarily have the inherent capability of withstanding high temperatures of the order of 1600° F. to as high as about 2000° F., and should possess high activity at substantially lower temperatures. The catalyst should have a relatively low threshold-activation temperature in order that the necessary conversion reactions become self-initiating within a minimum period of time following the startup of the engine at relatively cold conditions. These characteristics have been recognized as essential by the Motor Vehicle Pollution Control Board in setting forth the specifications relating to the efficiency with which the noxious components are eliminated or converted. The catalyst must, therefore, necessarily operate in a satisfactory manner at a temperature which can conceivably vary from about 200° F. to as high as about 2000° F., at any given time.

The catalytic composite of the present invention is characterized by the fact that it contains at least one catalytically active metallic component. As employed in the present specification, as well as in the appended claims, the term "metallic component" is intended to connote those components of the catalyst which are employed for their catalytic activity in converting the noxious material into innocuous components, as distinguished from that portion of the catalyst herein referred to as the refractory inorganic oxide, and which is employed for the purpose of supplying a suitable carrier material, or support, for the "catalytically active metallic components." Although not considered to be a limiting feature of the present inventon, it is preferred that the catalytically active metallic component, or components, be composited with a refractory inorganic oxide carrier material which has an apparent bulk density less than about 0.4 gram per cc. Preferred refractory inorganic oxides, for use as the carrier material, possess an apparent bulk density within the range of about 0.15 to about 0.35 grams per cc. The catalytically active metallic components, composited with the refractory inorganic oxide carrier material, may be one or more of the following: vanadium, chromium, molybdenum, tungsten, members of the iron-group and platinum-group of the Periodic Table, copper, silver and gold. A particular metal may be used in and of itself, or in combination with any of the foregoing metals. The catalyst of the present invention may comprise a metallic component selected from Groups V–A, VI–A and VIII of the Periodic Table. Thus, the catalyst to be employed in the treatment of noxious, gaseous combustible waste products, prior to discharging the same into the atmosphere, may comprise the following: platinum, palladium, other noble metals such as iridium, ruthenium and rhodium, iron, cobalt, nickel, copper vanadium, tungsten, molybdenum, silver, gold, and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. It is understood that the catalytic activity, stability, auto-initiating temperature, and other characteristics of the catalysts of the present invention, may vary from catalyst to catalyst. Many of the specific catalytic composites discussed herein do not necessarily yield equivalent results when compared with a catalyst comprising one or more different metallic components, or when utilized under varying conditions in different applications. Although the precise manner in which the catalytically active metallic component, such as platinum, is disposed within the carrier material, is not known with absolute certainty, it is believed that the platinum, or other metallic component, enters into a complex combination with the carrier material and other components of the catalyst. Therefore, it is understood that the use of the term "platinum," or "metallic component," for example, connotes platinum, or other metallic components existing within the carrier material in a combined form and/or in the elemental state.

The catalytic composite of the present invention, the method of the preparation of which is hereinafter set forth in greater detail, utilizes a refractory inorganic oxide as the carrier material for the active metallic components hereinbefore set forth. Refractory inorganic oxides possess particular physical characteristic which readily permit adaptation thereof to the rather unique environment encountered in the operation of a motor vehicle, as well as in other commercial applications. One desired physical characteristic, for example, is that extremely high temperatures do not apparently affect the capability of the material to function as desired. The refractory inorganic oxide carrier material, for utilization in the catalyst of the present invention, may be manufactured by any suitable method including separate, successive, co-precipitation means of manufacture when comprising two or more individual inorganic oxides. The carrier material may comprise naturally-occurring substances such as clays or earths, and may or may not be activated prior to use by one or more treatments including drying, calcining, steaming, or treatments with various reagents, etc. The catalytic composite of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, strontia, zirconia, hafnia, and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.0% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the sphere, and spheres may be continuously manufactured by the well-known oil-drop method: this method is described in detail in U.S. Patent No. 2,620,314, issued to James Hoekstra. In the interest of simplicity and clarity, the following discussion will be restricted to the use of alumina as the refractory inorganic oxide carrier material.

Where desired, halogen may be combined with the alumina and the catalytically active metallic components, and may be added thereto in any suitable manner either before, or after the incorporation of the active metallic components. The addition of the halogen is generally accomplished through the use of an acid such as hydrogen fluoride and/or hydrogen chloride, or volatile salt such as ammonium fluoride and/or ammonium chloride, and the halogen may be combined with the alumina during the preparation of the latter. In still another method of manufacture, the halogen may be composited with a refractory oxide during the impregnation thereof with the catalytically active metallic components. Thus, where the alumina is prepared from an alumina hydrosol having an aluminum to chloride weight ratio of about 1.3, the use of such method permits the incorporation of chloride where the latter is desired as the halogen component.

Regardless of the particular refractory inorganic oxide carrier material employed, the catalytically active metallic components may be added thereto in any suitable, convenient manner. However, in accordance with the present invention, prior to, or during the addition of the metallic component, such as platinum, the preformed inorganic oxide particles, such as alumina, are treated with an organic acid selected from a particular group thereof. In some instances, the organic acid may be combined with the metallic component, for example a water-soluble platinum-containing compound, and the resulting mixture then added to the alumina particles. The selected organic acid may be added to the alumina particles as a separate solution just prior to commingling with the metallic component. For ease in handling and metering, the organic acid is preferably admixed, in the requisite quantity, with the water-soluble compound of the intended catalytically active metallic component, and the resulting impregnating solution combined with the carrier material. With respect to platinum, suitable water-soluble compounds for utilization in the impregnating solution include chloroplatinic acid, chloroplatinous acid, platinous chloride, platinic chloride, etc. Where the catalytic composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The organic acid utilized in the method of the present invention, is selected from the group consisting of dibasic acids and derivatives thereof, having the following structural formula:

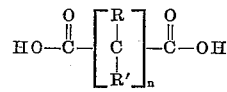

where:
R is selected from hydrogen, hydroxyl and alkyl groups;
R' is selected from hydrogen, alkyl and carboxyl groups
and
$n$ is within the range of 0–6.

As hereinafter indicated in a specific example, other organic acids including acetic and tetraacetic acids do not suffice to achieve the desired object for which such organic acid is utilized. In accordance with the structural formula given above, suitable organic acids for use in preparing the catalytic composite of the present invention include, but not by way of limitation, oxalic, malonic, succinic, glutaric, adipic, pimelic, suberic, malic, tartaric, citric, 2-methyl succinic, 2,3 di-ethyl succinic, 2,2 di-methyl succinic, mixtures of two or more, etc. The quantity of the dibasic organic acid, or derivative thereof, for example, tartaric acid, to be employed in admixture with the water-soluble compound of the catalytically active metallic component and the carrier material, is based upon the weight of such carrier material. The amount of organic acid employed is within the range of about 0.1% to about 1.5% by weight. An intermediate concentration of the organic acid and/or its derivative is preferred, and is within the range of from about 0.13% to about 0.70% by weight, based upon the weight of the carrier material. Through the utilization of the method of the present invention which principally comprises treating the carrier material with a particular quantity of a particular organic acid, the use of lesser quantities of the active metallic components to achieve the desired end result is permitted.

The quantity of the catalytically active metallic components is based upon the volume of the carrier material to be combined therewith, and is calculated on the basis of the elemental metal, notwithstanding that the metallic component may exist in some combined complex form, or in the elemental state. Thus, with respect to platinum-group metals, the platinum will be present in an amount of from about 0.05 to about 1.0 troy ounces per cubic foot of carrier material. The preferred range of the concentration of the platinum component, dictated by economic considerations, is from about 0.15 to about 0.60 troy ounces per cubic foot of carrier material. The other metallic components, either in conjunction with, or instead of the platinum component, will be present in an amount of from about 0.01 to about 2.0 troy ounces per cubic foot of carrier material employed.

The organic acid may be employed as a mixture of two or more, and may be diluted with any suitable non-alkalinous solubilizing substances such as water, alcohol, acetone, etc. Of the organic acids above set forth, citric, oxalic, and tartaric acids are the preferred organic acids to be employed in the method of the present invention, citric acid being particularly preferred. The organic acid may be admixed with the water-soluble compound of the catalytically active metallic component, or components, or mixed with the alumina prior to the addition of the metallic component thereto. In any case, it is an essential feature of the present invention that the metallic component be not combined with the alumina prior to the addition of the organic acid. Another essential feature of the present invention is that the commingling of the refractory inorganic oxide, the catalytically active metallic component and the organic acid may be accomplished in the absence of substances and reagents of an alkalinous nature, particularly including ammonia and other nitrogenous compounds, alkali metal compounds, etc. It has further been found that the catalytic composite is adversely affected when contacted with a nitrogen-containing gas during the final high-temperature stages of the manufacture thereof.

In describing the method of manufacturing the catalytic composite encompassed by the present invention, it is understood that the same is not considered to be unduly limited to the particular catalytic composite described. The catalyst is prepared by initially forming alumina spheres, 1/16-inch to about 1/8-inch in diameter, from an aluminum chloride hydrosol having an aluminum chloride weight ratio of about 1.25. The alumina spheres are continuously prepared by passing droplets of the hydrosol into an oil bath maintained at an elevated temperature, retaining the droplets within the oil until the same set into hydrogel spheroids. The spheroids are dried at a temperature of from about 200° F. to about 800° F., and thereafter subjected to a calcining treatment at a temperature of from about 800° F. to about 1200° F. An impregnating solution of chloroplatinic acid, having the concentration of 0.0628 gram of platinum per milliliter, is prepared by diluting 3.0 milliliters to about 500 milliliters with water. When utilized with about 150 grams of the alumina spheres, having an apparent bulk density of about 0.29 gram per cc., this concentration of the chloroplatinic acid solution will yield a final composite having about 0.32 troy ounce of platinum per cubic foot of the spherical alumina carrier material. The chloroplatinic acid solution is commingled with about 0.52 gram of citric acid, or 0.35% by weight based upon the weight of the alumina spheres. The resulting mixture of citric acid, chloroplatinic acid and alumina spheres is evaporated to dryness in a rotating dryer at a temperature of about 210° F. When the alumina spheres appear visually dry, usually in about 2 to about 8 hours, the impregnated spheres are subjected to a reducing treatment, preferably in an atmosphere of hydrogen, while increasing the temperature to a level within the range of about 900° F. to about 1800° F., maintaining the elevated temperature for about 2 hours. Contrary to present-day methods of manufacturing catalytic composites, the catalyst of the present invention is not subjected to an oxidation treatment at elevated temperature, or to high-temperature calcination in an atmosphere of air. A high-temperature oxidation treatment tends to destroy both the initial activity, and more particularly the stability of the catalytic composite to effect the removal and/or conversion of the noxious components in the combustible gaseous waste products. Furthermore, oxidation in air will cause the catalytic composite to come in contact with nitrogen at an elevated temperature, and, as hereinafter indicated, such treatment tends to destroy the stability of the catalytic composite.

From the foregoing description of the present invention, it will be noted that the inorganic oxide carrier material is combined with the catalytically active metallic component in the presence of a particular quantity of an organic acid selected from the group consisting of dibasic organic acids and derivatives thereof, having the following structural formula:

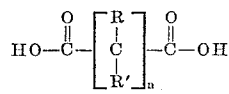

where:

R is selected from hydrogen, hydroxy and alkyl groups;
R' is selected from hydrogen, alkyl and carboxyl groups, and $n$ is within the range of 0 to 6.

The concentration of the organic acid is from about 0.1% to about 1.5%, and is based upon the weight of the carrier material to be impregnated with the active metallic component. It is recognized that the prior art teaches broadly the "activation" of refractory inorganic oxides through the utilization of various reagents including organic acids. Such "activation" is, however, immediately followed by a high-temperature calcination treatment prior to the incorporation of the catalytically active metallic components. However, the particular concentration of the organic acid, as utilized in the method of the present invention, and in the manner set forth, results in a catalytic composite having a physical structure heretofore not obtained. This phenomenon is more clearly described and illustrated in the accompanying FIGURES 1, 2, 3 and 4. These figures illustrate the cross-section of an alumina spherical particle, taken through the center thereof, which particle contains a platinum component as the catalytically active metallic component. With reference now to the figures, FIGURE 1 illustrates an alumina-platinum composite prepared in the absence of the organic acid, or with an organic acid in a concentration less than about 0.10% by weight based upon the weight of alumina. In the figure, numeral 1 denotes the exterior surface of the entire sphere, numeral 2 denotes a continuous finite layer of the platinum component and numeral 3 refers to the porous alumina core, noted to be virtually free from the platinum component. It will be further noted, upon reference to FIGURE 1, that the absence of the organic acid, or the use of too little organic acid during the impregnation of the sphere, has produced a catalytic particle in which virtually the entire quantity of the catalytically active metallic component resides on the surface thereof.

Figure 2:
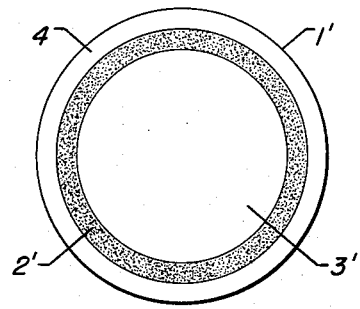

With reference to FIGURE 2, illustrating the cross-section of an alumina sphere impregnated with a platinum component and a dibasic acid, and/or derivative thereof, from the group of acids hereinbefore defined, in accordance with the method of the present invention, numeral 1' connotes the exterior surface of the entire sphere, 2' refers to the totally imbedded continuous layer of the platinum component, 3' indicates the inner core of alumina (virtually free from the platinum component), and numeral 4 indicates an outer band of alumina also virtually free from the platinum component. It is noted that the use of the present invention has produced a catalytic particle in which the catalytically active metallic component is imbedded as a layer within the refractory inorganic oxide, and is disposed a finite distance from the exterior surface and a finite distance from the center thereof.

Figure 3:
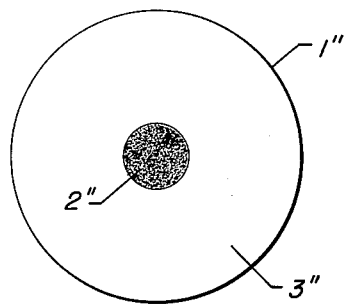

With reference to FIGURE 3, 1" denotes the entire spherical particle, 2" a virtually solid inner core of the platinum component and 3" indicates a wide outer band of substantially pure alumina. The catalytic particle illustrated in FIGURE 3 results when the organic acid is employed in a concentration greater than about 1.5% by weight, based upon the weight of the alumina. Upon reference to FIGURE 4, 1'" denotes the entire spherical particle and 2'" denotes the alumina interior in which the platinum component is quite thoroughly and evenly distributed. The catalytic particle having the structural character illustrated in FIGURE 4, results when the organic acid is employed in the presence of ammonia or other alkalinous-acting material, notwithstanding that the organic acid concentration may lie within the range of from about 0.1% to about 1.5% by weight.

In addition to the aliphatic, organic dibasic acids, and derivatives thereof hereinabove described, aromatic organic acids containing a hydroxyl group adjacent to the carboxylic group, have been found, which when employed in accordance with the method of the present invention, produce a catalytic particle having the structure shown in FIGURE 2. For example, salicylic acid, when utilized in an amount within the range of about 0.1% to about 1.5%, produced a platinum-containing catalytic particle in which the totally imbedded layer of the platinum component was clearly visible to the naked eye. Derivatives of such aromatic, organic acids, including gamma resorcylic acid, and others having a hydroxyl group adjacent the carboxylic group, also result in such a physical structure.

It is readily ascertained that the use of the method of the present invention has produced a catalytic particle having a novel physical structure in which the active metallic component is completely imbedded as a layer within the particle, and is disposed a finite distance from the center and exterior surface of the particle. As hereinbefore indicated and set forth, in specific examples, the catalytic particle of the character represented in FIGURE 2 possesses the requisite stability of a catalytic composite intended to serve the function of eliminating noxious components from gaseous combustible waste products, and particularly for converting the hydrocarbonaceous gaseous waste products emanating from the exhaust of an internal combustion engine. Catalytic particles having physical structures illustrated by FIGURES 1, 3 and 4, either have a high initial activity and virtually no stability, or substantially no conversion activity and a high degree of stability. FIGURES 1, 2, 3 and 4 were made from cross-sectional photographs of spherical alumina-platinum composites prepared in conjunction with the specific examples hereinafter set forth. The impregnated platinum component was made more visible and contrasting through the use of stannous chloride. Although only spherically shaped particles have been illustrated, it is understood that the method of the present invention is adaptable for utilization with inorganic oxide particles of any desired shape. For example, in the case of an alumina particle having the shape of the well-known Raschig ring, a horizontal cross section would show the hollow center, characteristic of the Raschig ring, a band of alumina substantially free from the platinum component, a continuous layer of the platinum component which has been impregnated completely within the alumina, and lastly, an outermost band of alumina substantially free from the platinum component.

The following examples are given for the purpose of illustrating clearly the method of manufacturing the catalytic composite encompassed by the present invention. It is understood that the present invention is not to be unduly limited, beyond the scope and spirit of the appended claims, by the conditions, reagents, concentrations, or catalytic composites employed within the examples. When considered in conjunction with the accompanying FIGURES 5 through 11, the data presented within the examples will indicate the benefits to be afforded through the utilization of the present invention, which invention produces a catalytic composite having the physical structure illustrated in accompanying FIGURE 2. It will be readily ascertained that the catalytic composite offers particular advantages in a process for the elimination of the products of incomplete combustion from the hydrocarbonaceous exhaust gases emanating from an internal combustion engine, by which method such exhaust gases become innocuous upon being discharged into the atmosphere.

*Example 1*

The catalysts employed in this example were prepared by initially forming alumina spherical particles of ⅛-inch diameter and having an apparent bulk density of about 0.29 gram per cc. The two catalysts were prepared in such a manner that the concentrations of catalytically active metallic component were identical, and the entire manufacturing process would be the same with but one exception; that is, one catalyst was prepared by effecting the impregnation in the presence of citric acid, in accordance with the method of the present invention. The ⅛-inch alumina spheres were divided in two separate portions, each being impregnated with a sufficient quantity of chloroplatinic acid (having a concentration of 0.0628 gram of platinum per milliliter) to yield a catalyst containing 0.47 troy ounce of platinum, calculated as the element thereof, per cubic foot of alumina. For each 150 grams of the alumina spheres, the required quantity of chloroplatinic acid was diluted to 500 milliliters with water. Prior to being impregnated, the impregnating solution for one catalyst portion was admixed with 0.22% by weight of citric acid, based upon the total quantity of alumina particles. Both catalyst portions were individually and separately evaporated to dryness in a rotating dryer at a temperature of about 210° F. While increasing the temperature to a level of about 1000° F., the catalyst portions were subjected to an atmosphere of hydrogen; after reaching a temperature level of 1000° F., the hydrogen treatment was continued at that temperature for a period of 2 hours. The catalyst portions were allowed to cool prior to being exposed to the atmosphere.

Figure 5:
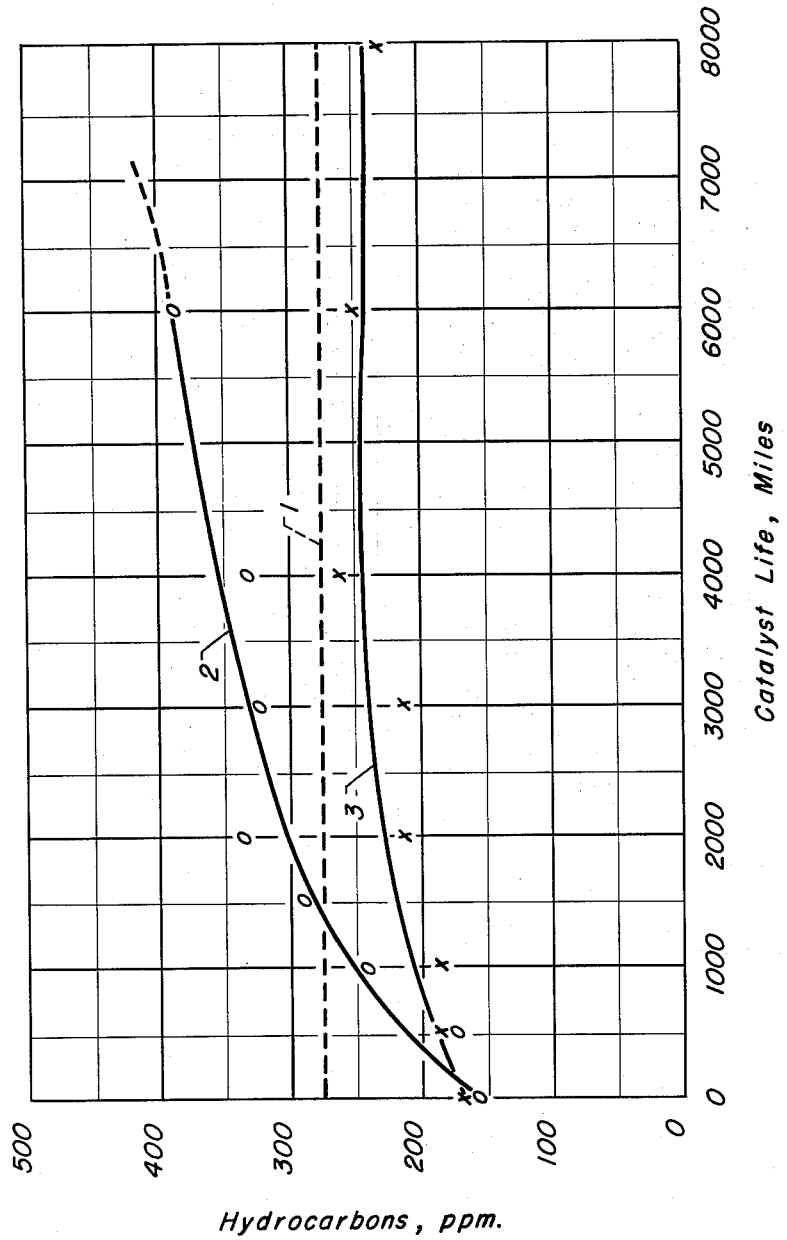

The two catalyst portions were then subjected to chassis dynamometer road testing in accordance with the 7-mode cycle set forth in the Vehicular Exhaust Emission specification approved by the Motor Vehicle Pollution Control Board of the State of California. The Vehicular Exhaust Emission specifications herein referred to are those which were approved on May 19, 1961. Aside from the specific limitations placed upon the method of testing, which limitations were strictly adhered to during the chassis dynamometer testing, the specification includes a maximum tolerable limit with respect to the concentration of hydrocarbons and carbon monoxide within the exhaust gases of the internal combustion engine. The maximum tolerable limit on hydrocarbon concentration is 275 p.p.m., the tolerable concentration of carbon monoxide being less than 1.5%. With reference now to FIGURE 5, dotted line 1 indicates the tolerable limit on hydrocarbons of 275 p.p.m. Line 2, drawn through the circles, indicates the results obtained through the use of catalyst prepared in the absence of the citric acid; it is noted that this catalyst exceeded 275 p.p.m. of hydrocarbons in the exhaust gas at approximately 2000 miles. Line 3 illustrates the results obtained through the use of the catalyst of the present invention, during the preparation of which citric acid was employed in the impregnating solution. It is noted that the hydrocarbon concentration in the exhaust gases did not exceed 275 p.p.m. for the 8000 miles illustrated, and, in fact, appears to indicate a slightly downward trend. One of the more important aspects of the data as presented in FIGURE 5 is the apparently greater degree of stability of the catalyst prepared by the method incorporating the use of citric acid.

Figure 6:
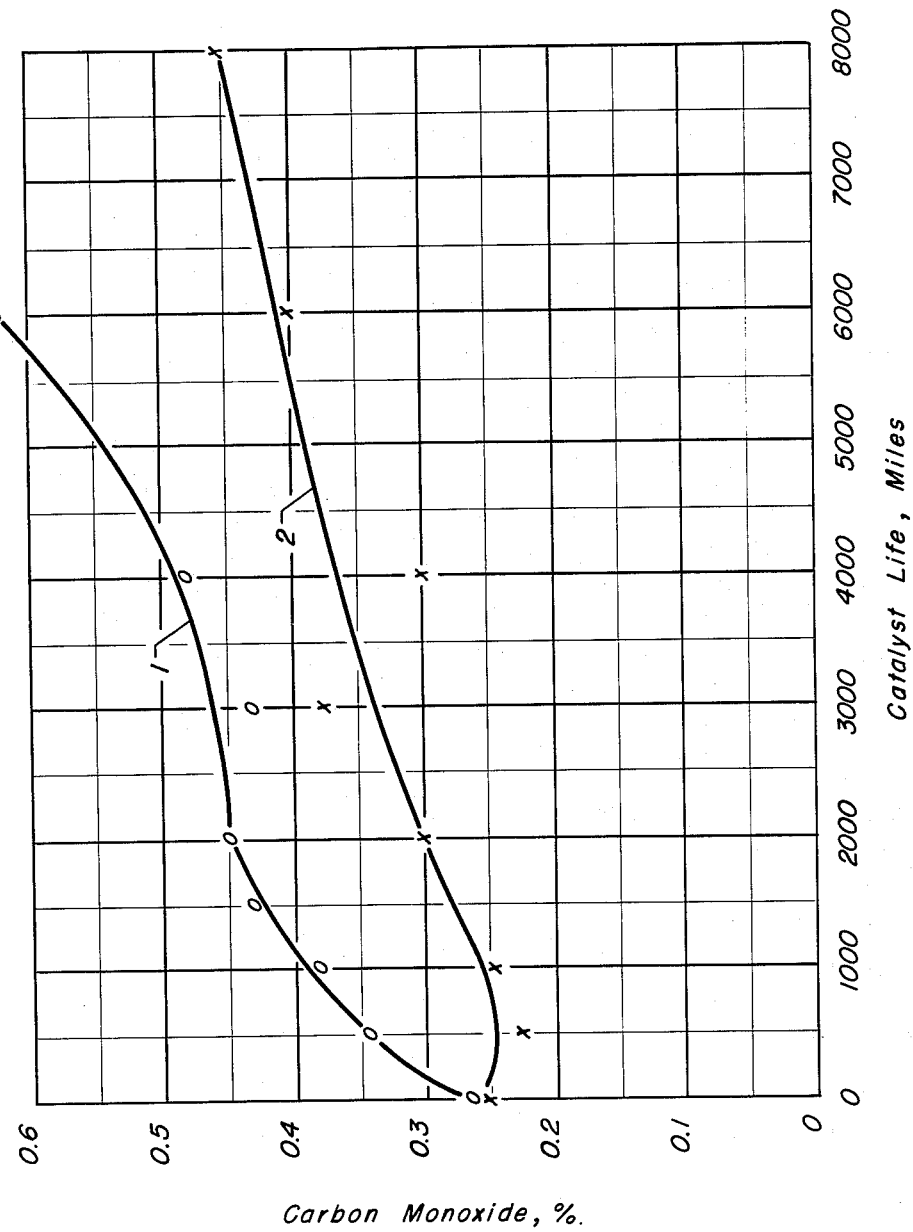

Similarly, FIGURE 6 illustrates the comparison of the two catalytic composites with respect to the concentration of carbon monoxide in the exhaust gases. Line 1 represents the results of the catalyst prepared in the absence of citric acid, while line 2 illustrates the results obtained through the use of the catalyst of the present invention. Although the carbon monoxide concentration for both catalysts is below the 1.5% specified limit, it is readily ascertained that the catalyst of the present invention possesses greater stability and will function acceptably, with respect to carbon monoxide concentration, for a period of time much longer than the catalyst prepared in the absence of the citric acid.

The data employed in the illustrations embodied by FIGURES 5 and 6 are given in the following table, in which A designates the catalyst prepared in the absence of citric acid and B designates the catalyst prepared in accordance with the present invention:

TABLE.—MVPCB[1] SEVEN-MODE CYCLE ROAD TESTING

| Catalyst Life, Miles | Hydrocarbons, p.p.m. | | Carbon Monoxide, Percent | |
|---|---|---|---|---|
| | A | B | A | B |
| 0 | 165 | 166 | 0.26 | 0.27 |
| 501 | 174 | 185 | 0.34 | 0.23 |
| 1,013 | 242 | 188 | 0.38 | 0.25 |
| 1,521 | 289 | | 0.43 | |
| 2,007 | 335 | 215 | 0.45 | 0.29 |
| 3,085 | 323 | 215 | 0.43 | 0.38 |
| 4,137 | 331 | 268 | 0.48 | 0.30 |
| 6,000 | 387 | 250 | 0.63 | 0.40 |
| 8,031 | | 229 | | 0.48 |

[1] Motor Vehicle Pollution Control Board.

The 7-mode road testing cycle prescribed by the Vehicular Exhaust Emission specifications is a chassis dynamometer test procedure. A single cycle covers a total period of time of 137 seconds, the seven modes being as follows: (1) idling; (2) acceleration to 30 miles per hour; (3) cruise at 30 miles per hour; (4) deceleration to 15 miles per hour; (5) cruising at 15 miles per hour; (6) acceleration to 50 miles per hour; and (7) deceleration to idle. From a cold start-up, the specifications require an operation of 7 to 8 cycles, the first four considered as the warm-up period which includes a cold start, the 7th or 8th cycle being considered the hot cycle. The maximum limitations placed upon the hydrocarbon concentration, p.p.m., and the carbon monoxide, in percent, is specified as being the sum of 45% of the average of four warm-up cycles and 55% of a single hot cycle. The data presented in the foregoing table, and employed in FIGURES 5 and 6, were obtained in accordance with the foregoing Vehicular Exhaust Emission specifications.

The following examples are those which were employed in obtaining the data illustrated in the accompanying FIGURES 7, 8, 9, 10 and 11, and utilized a specific catalyst evaluation test procedure designed to determine the catalytic stability with respect to automotive exhaust conversion. The various catalytic composites are evaluated by a test procedure which simulates actual driving conditions. The test procedure involves the utilization of a standard dynamometer, by which an 8-cylinder internal combustion engine is loaded, or driven, by a motor-generator. Approximately 440 cc. of each of the catalyst portions are individually evaluated by being placed within a cylindrical vessel, or convertor, having an inside diameter of about 4 inches, the entire apparatus being serially connected into the engine exhaust line. The catalyst sample is disposed within the convertor on a supporting screen to a bed height of about 2 to about 3 inches. A second screen is placed above the catalyst bed for the purpose of separating the catalyst from the ¼-inch ceramic balls employed to facilitate the even distribution of the exhaust gases flowing downwardly through the apparatus. Four such catalyst-loaded convertors are utilized in a given test period; this practice permits the simultaneous testing of different catalysts, and provides an excellent basis for making a comparative study of the results.

Combustion air is pressured into the convertor inlet, the flow rate being adjusted such that the average temperature of the catalyst bed is maintained at a level within the range of about 800° F. to about 1700° F. It is preferred that the flow rate of combustion air be held constant at about six pounds per hours, such that the catalyst bed average temperature is maintained at a level of about 950° F. The fuel employed in the test procedure is a blend of catalytically reformed gasoline (40.0%), catalytically cracked gasoline (40.0%) and alkylate (20.0%), and contains 3.0 milliliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising or decelerating, the test procedure still further approximates actual road conditions by providing for a constant load throughout only a portion of the entire test period. Samples of the convertor inlet and outlet gases are taken at various intervals during the test procedure, there being a constant analysis for the concentration of carbon monoxide. The samples are analyzed for hydrocarbons by a flame-ionization detector. The term "hydrocarbon," as utilized in reporting the results of the analyses performed on the effluent gases from the catalytic convertor, connotes all hydrocarbons whether saturated, unsaturated, or partially oxidized as hereinbefore set forth. The carbon monoxide concentration within the exhaust gases is determined by an accurate infra-red detector. The internal combustion engine is operated in a particular cycle to simulate idling, accelerating, cruising and decelerating as experienced under actual road conditions. During the entire test procedure, which covers a period of about 40 hours, about 300 gallons of the aforementioned fuel is employed. The 40-hour test period is divided into eight five-hour cycles; each five-hour cycle consists of a four and one-half hour cruise at a constant 2500 r.p.m. and 41 brake horsepower, and a one-half hour cycle consisting of a series of 15 two-minute cycles comprising idling at 750 r.p.m., accelerating to cruise at 2000 r.p.m., and a deceleration to idling at 750 r.p.m.

An inherent result of the small volume of catalyst employed in the test evaluation procedure is that the space velocity of the exhaust gases coming into contact with the catalyst is considerably higher than would usually be encountered under actual driving conditions. Accordingly, the percentage conversion obtained during actual use in automotive exhaust gas convertors would be considerably higher. The data obtained from the 40-hour test procedure is plotted on semi-logarithmic coordinates and results in a curve from which the following equation is derived:

$$C = Ae^{-t/k}$$

In the equation, $k$ equals the reciprocal of the slope, A equals the percent initial conversion obtained by extrapolation, C equals the percent conversion in time ($t$), and $t$ equals the time in hours. The above equation is employed in computing the "$k$" stability factors for the individual catalytic composites. A decrease in the slope of the curve resulting from the data obtained, or conversely, an increase in "$k$" value, indicates a catalyst possessing a greater degree of stability when converting the hydrocarbonaceous combustion products of an internal combustion engine. In those instances where the "$k$" stability factor is positive, indicating a positive slope, the stability of the catalyst being evaluated may be said to increase with time.

The foregoing described test procedure is employed as a primary evaluation of the catalysts intended to be subjected to the 7-mode cycle operation described in conjunction with the foregoing Example I. The importance of this primary evaluation resides in the "$k$" stability factor of the catalytic composite being tested. That is, although a wide variety of catalytic composites possess a relative high initial activity, the stability of such catalysts is such that the maximum tolerable limits imposed upon the hydrocarbon and carbon monoxide concentrations are reached in a relatively short period of time.

*Example II*

This example is presented for the purpose of illustrating the adverse effects upon the catalytic composite which has been subjected to high-temperature treatment in an atmosphere of nitrogen. These catalysts were prepared utilizing the alumina spheres and chloroplatinic acid solution described in Example I; however, the impregnation of the spheres with the chloroplatinic acid was not conducted in the presence of an organic acid selected from the group hereinbefore set forth. The chloroplatinic acid solution was employed in an amount such that the final catalytic composite contained 0.19 troy ounce of platinum, calculated as the element, per cubic foot of alumina. Following the drying of the impregnated alumina spheres, at a temperature of about 210° F., the temperature was increased in the first instance to a level of 1000° F., in the presence of nitrogen, and maintained at this level for a period of 2 hours. In a second instance, the catalyst temperature was increased to a level of 1500° F., in the presence of nitrogen, again remaining at this level for a period of 2 hours. The results of the automotive exhaust conversion test procedure, with respect to the two nitrogen-treated catalysts, are presented in FIGURE 7.

Figure 7:
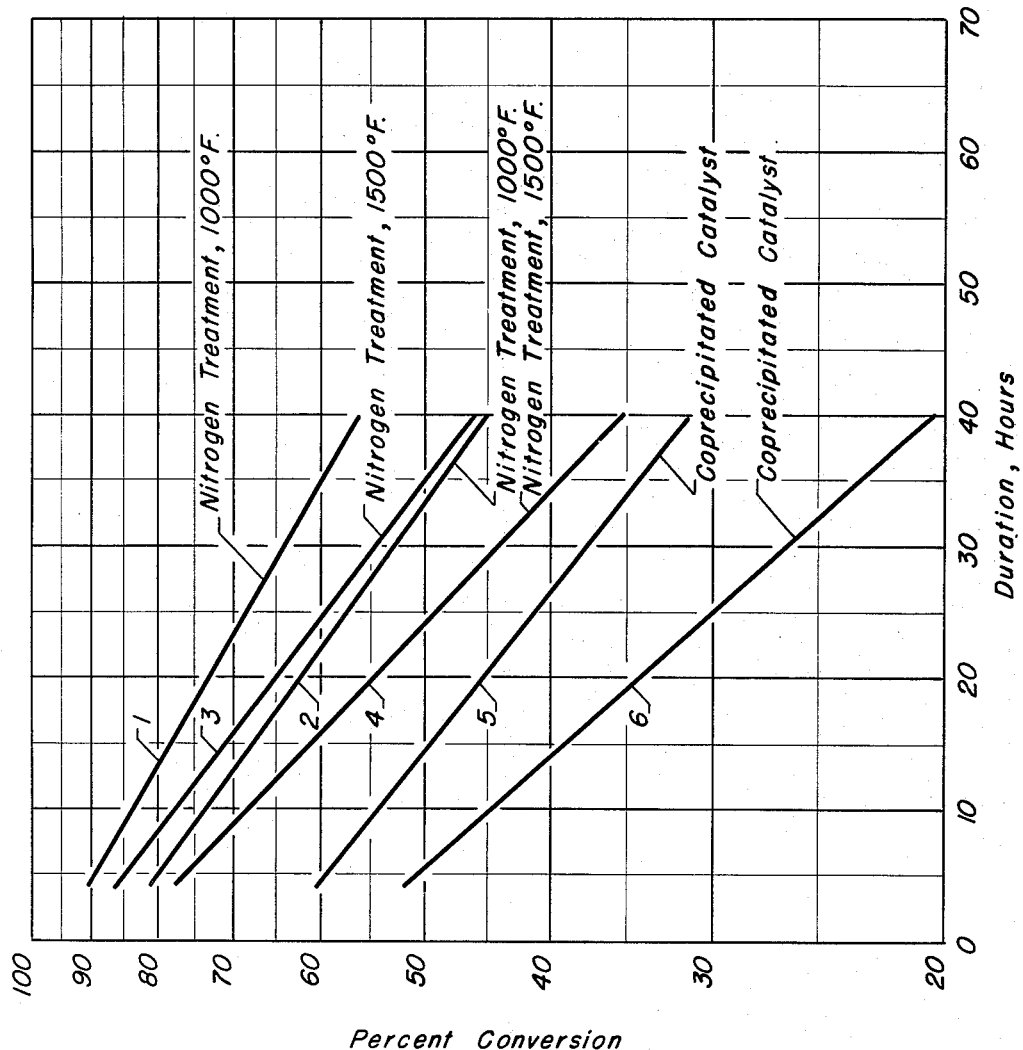

With reference to FIGURE 7, lines 1 and 2 represent the stability curves of the catalyst treated at 1000° F., for the conversion of carbon monoxide and hydrocarbons respectively. The "$k$" stability factors, derived from lines 1 and 2 by means of the previously indicated equation are 79.5 with respect to carbon monoxide and 68.2 with respect to the concentration of hydrocarbons. Lines 3 and 4 represent the results of the evaluation of the catalyst which had been nitrogen-treated at a temperature of 1500° F. The "$k$" stability factors were found to be 61.4 for carbon monoxide and 49.3 with respect to the concentration of hydrocarbons. A standard reference catalytic composite, containing 0.19 troy ounce of platinum per cubic foot of alumina, prepared in the absence of an organic acid, however, with a high-temperature treatment in the presence of hydrogen rather than nitrogen, indicates a "$k$" stability factor of about 90 to 120 with respect to the concentration of hydrocarbons and a stability factor of about 110 to about 150 with respect to the concentration of carbon monoxide. Upon comparing the "$k$" stability factors, it is readily noted that the high-temperature treatment in an atmosphere of nitrogen has adversely effected the platinum-containing catalyst of the type commonly manufactured by present-day operations.

Figure 4:
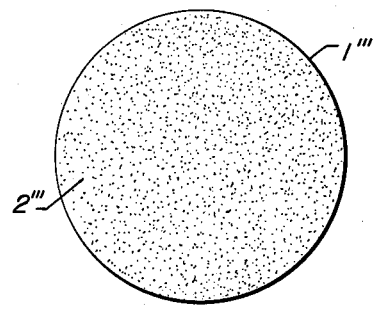

Also illustrated in FIGURE 7 in lines 5 and 6 are the results of the evaluation test with respect to a catalytic composite of alumina and platinum prepared by the method commonly referred to as "co-precipitation." The co-precipitation method of manufacturing allegedly results in a catalytic composite in which the catalytically active metallic component, in this case platinum, is thoroughly and evenly distributed throughout the carrier material. A cross section of a catalyst of this nature would have the appearance of the catalytic particle illustrated in FIGURE 4. The results of the evaluation test procedure on the co-precipitated catalyst indicated a stability factor of 59.4 with respect to carbon monoxide and 36.1 with respect to the concentration of hydrocarbons. When compared to the "$k$" stability factors of the standard catalyst, it is readily ascertained that the co-precipitated catalyst is not readily adaptable to the process of eliminating the noxious components from automotive exhaust gases, notwithstanding that such co-precipitated catalysts, having the physical structure as indicated in FIGURE 4, are considered to be highly advantageous when employed in processes specifically designed for the catalytic reforming of various hydrocarbon mixtures to produce high quality motor fuel.

*Example III*

Figure 8:
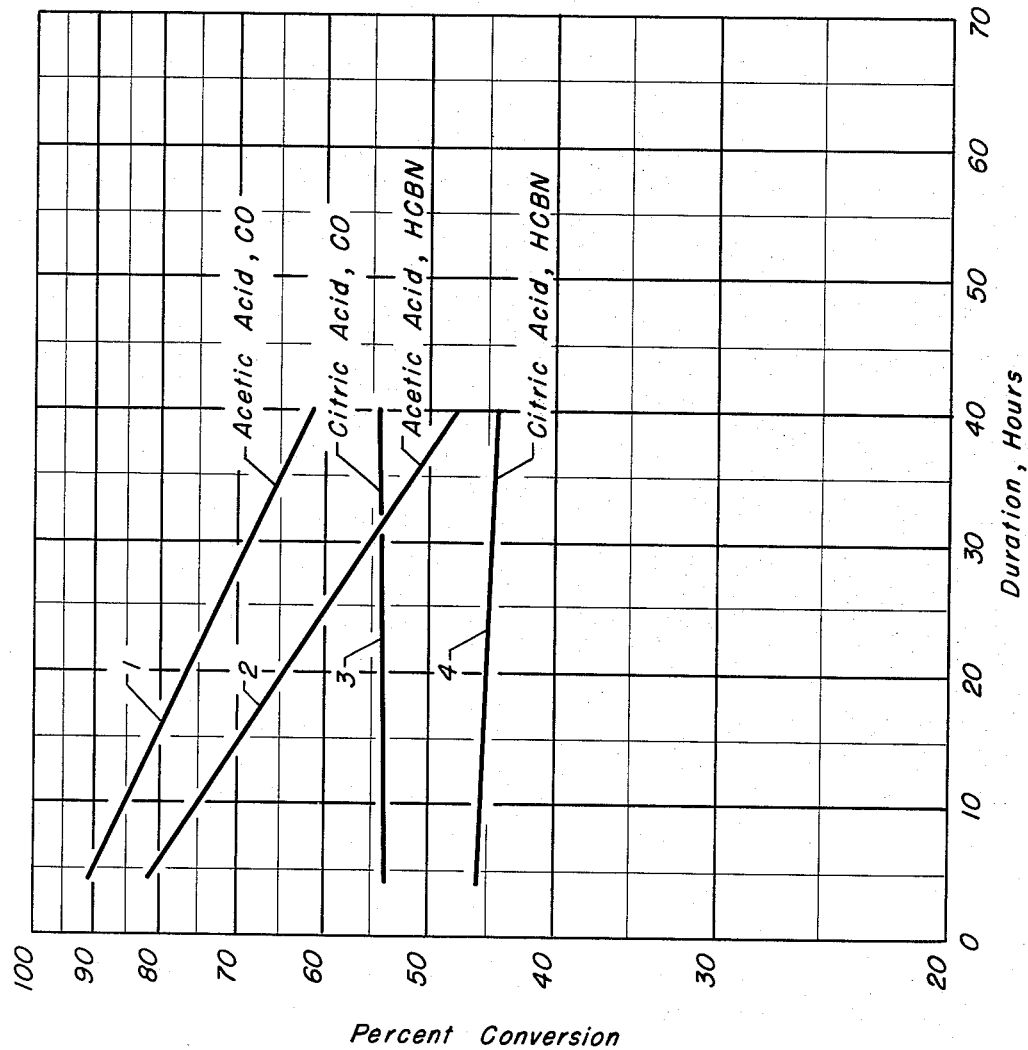
Figure 9:
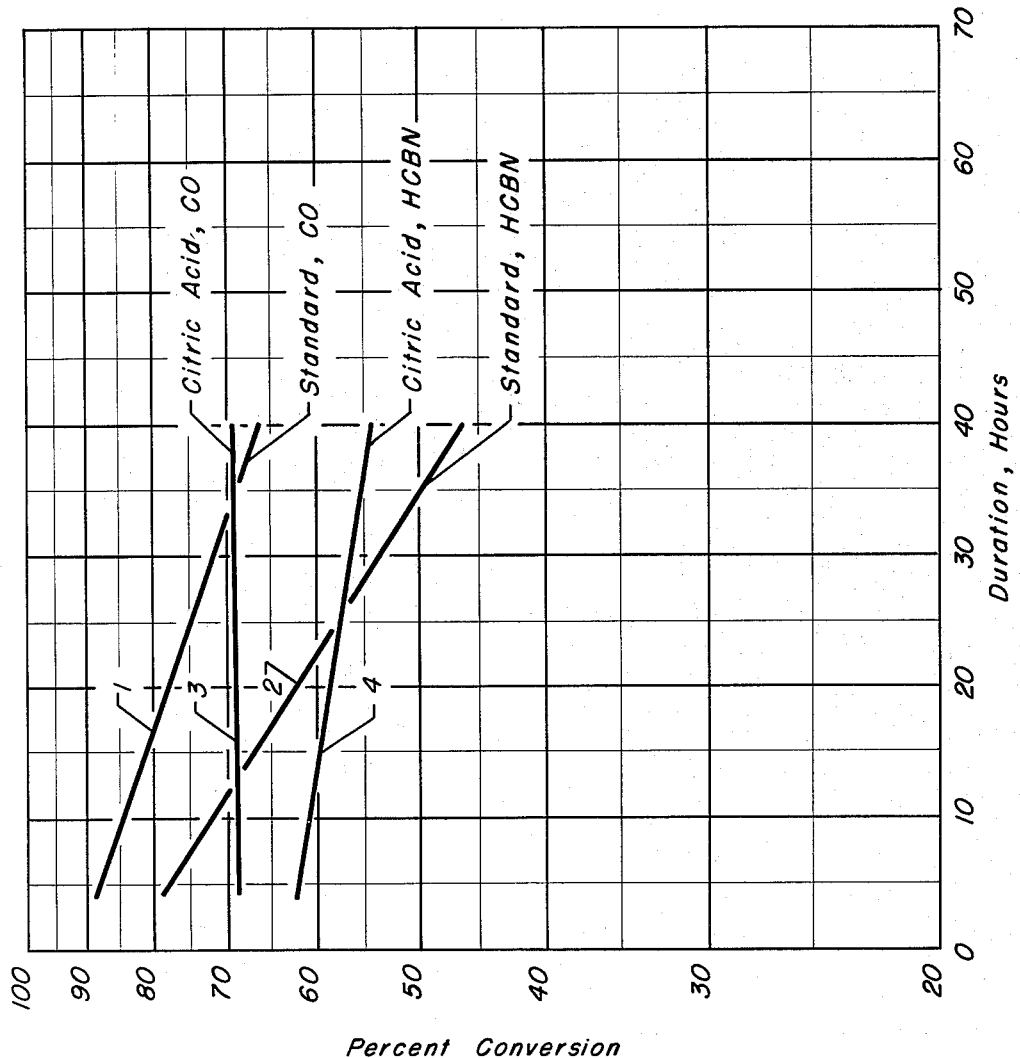

The data obtained in this example is illustrated in the accompanying FIGURE 8. The first catalyst was prepared in accordance with the method described in reference to Example I, utilizing sufficient chloroplatinic acid to yield a finel composite containing 0.19 troy ounce of platinum per cubic foot. During the impregnation of the alumina spherical particles with the chloroplatinic acid, 1.05 grams of acetic acid were added for each 150 grams of alumina spheres, or acetic acid in an amount of about 0.70% by weight. The results of the catalyst evaluation test, with respect to the acetic acid-treated catalyst are indicated in FIGURE 8 by stability lines 1 and 2, representing "$k$" stability factors of 90.7 with respect to the quantity of carbon monoxide, and 73.4 with respect to the concentration of hydrocarbons, respectively. The standard reference catalyst, tested simultaneously with the acetic acid-treated catalyst, but in a separate convertor as stated in the foregoing description of the test procedure, indicated stability factors of 118.7 and 163.9 respectively. The effect of the use of acetic acid, resulting in a catalytic particle having the physical structure illustrated by FIGURE 4, has been to decrease the degree of stability of the catalytic composite as indicated by a change in the hydrocarbon stability factor from 118.7 to 73.4; the stability factor for carbon monoxide decreasing from 163.9 to 90.7. Thus, the utilization of acetic acid, notwithstanding its similarity to oxalic, citric and/or tartaric acids, is seen to be non-applicable in preparing a catalyst for the conversion and/or removal of noxious components from automotive exhaust gases.

A second catalyst was prepared by the method set forth in Example I, utilizing sufficient chloroplatinic acid to result in a catalyst containing 0.32 troy ounce of platinum per cubic foot, impregnated in the presence of 1.08% by weight of citric acid, based upon 170 grams of the alumina spherical particles. The results obtained through the utilization of the citric acid treated catalyst are indicated by lines 3 and 4 in FIGURE 8, illustrating the stability curves for carbon monoxide and hydrocarbons respectively. It should be immediately noted that line 3 possesses a positive slope, the "$k$" stability factor being calculated as 2731.5+, compared to 116.3 for the standard reference catalyst. The "$k$" stability factor with respect to hydrocarbon concentration was found to be 115.5, indicated in FIGURE 8 by line 4, compared to 68.5 for the standard. The importance of the data illustrated in FIGURE 8 resides in the fact that the stability curves, lines 3 and 4, for the citric acid-treated catalyst are virtually horizontal, indicating a catalytic composite possessed with an unusually high degree of stability when employed in the conversion of carbon monoxide and the hydrocarbonaceous material contained within the exhaust gases of an automotive internal combustion engine.

*Example IV*

This example is presented to show the results obtained from the evaluation test procedure comparing the standard catalyst and a catalyst prepared through the use of 0.35% by weight of citric acid, based upon the quantity of alumina, during the impregnation of the latter with sufficient chloroplatinic acid to result in a catalyst containing 0.32 troy ounce of platinum per cubic foot. The acid-treated catalyst and the standard catalyst were simultaneously subjected to the catalyst evaluation test procedure, however, having been placed in individual convertors through which the engine exhaust gases were passed. The results are graphically ilustrated in accompanying FIGURE 9, lines 1 and 2 indicating the stability curves of the standard reference catalyst, lines 3 and 4 indicating the stability curves of the citric acid-treated catalyst. The citric acid-treated catalyst indicated a "$k$" stability factor of 208.5 with respect to the quantity of hydrocarbons, the standard reference catalyst indicating a "$k$" stability factor of 90.8; the stability factor with respect to carbon monoxide, resulting from the use of the citric acid-treated catalyst indicated a slightly positive slope (line 3), calculated as 12120.1+, whereas the carbon monoxide "$k$" stability factor for the standard reference catalyst was 125.5.

In order to illustrate the detrimental effects exhibited when the catalyst is prepared in the presence of alkalinous material, such as ammonia, a catalyst was prepared in accordance with the method of the present invention utilizing 0.35% by weight of citric acid, based upon the weight of alumina particles, during the impregnation of the chloroplatinic acid solution to yield a catalyst containing 0.32 troy ounce of platinum per cubic foot. The "*k*" stability factor with respect to the concentration of hydrocarbons was 126.5, a significant decrease from 208.5 as hereinabove indicated; the carbon monoxide "*k*" stability factor was 214.7, substantially less than the positive slope indicated by the catalyst prepared by the method excluding alkalinous material. The ammonia-treated catalyst was prepared by including 181 milligrams of ammonia in the citric acid-chloroplatinic acid impregnating solution, resulting in a pH thereof of about 7.0.

This particular example illustrates clearly the benefits afforded through the utilization of the present invention, particularly with respect to the use of an organic acid in relatively minor concentration; the present invention unquestionably produces a highly stable catalytic composite. The example further illustrates the detrimental effects of the presence of ammonia and/or other alkalinous material during the impregnation of the carrier material with the catalytically active metallic component.

*Example V*

Figure 10:
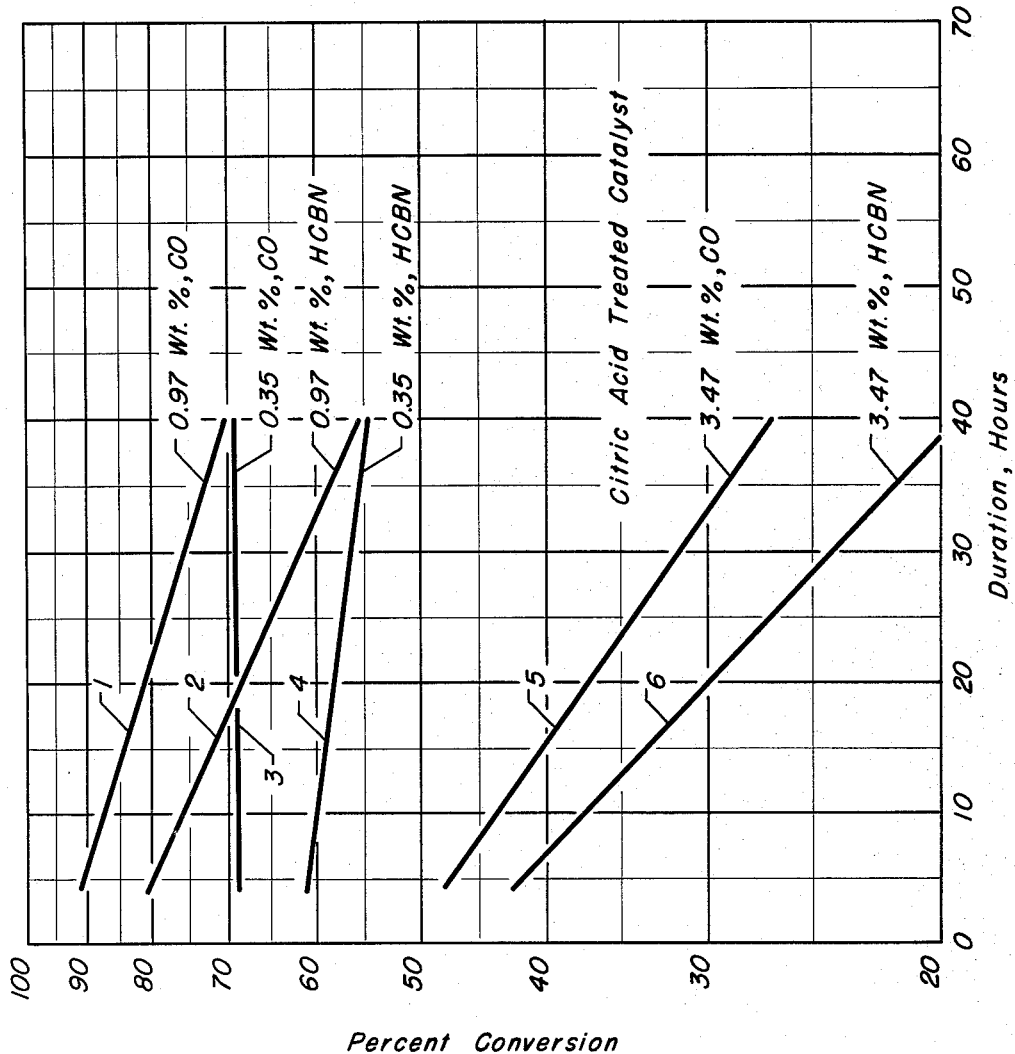

Three different catalytic composites were prepared in obtaining the data presented in this example; reference is made, in this example, to accompanying FIGURE 10 which illustrates the results of the 40-hour catalyst evaluation procedure. The first catalyst was prepared to contain 0.32 troy ounce of platinum per cubic foot, which had been impregnated within the alumina spherical particles in the absence of an organic acid. However, following the high-temperature reduction treatment in hydrogen, the catalytic composite was cooled and treated with 1.46 grams of citric acid per 150 grams of alumina, or 0.97% by weight of citric acid. The results of the 40-hours test procedure are indicated as lines 1 and 2 in FIGURE 10; The stability factors obtained with respect to this catalyst were 142.9 in regard to the carbon monoxide, and 104.6 with respect to the hydrocarbon concentration. The standard reference catalyst, tested simultaneously in a separate convertor, indicated a "*k*" stability factor of 125.5 and 90.8 respectively. There would appear to be a slight improvement over the standard catalyst in treating such a catalyst with the organic acid following a high-temperature treatment. However, it will be noted that the improvement in "*k*" stability factors is quite small, especially when compared to the second catalyst, the results of which are represented by lines 3 and 4 in FIGURE 10. The second catalyst was prepared to contain 0.32 troy ounce of platinum per cubic foot, which platinum was impregnated within the alumina in the presence of 0.35% by weight of citric acid, based upon the quantity of alumina. This catalyst was tested simultaneously with the two above-described catalytic composites, and indicated a "*k*" stability factor for hydrocarbons of 208.5; it will be noted, upon reference to FIGURE 10, that the "*k*" stability factor for carbon monoxide was positive, the slope of line 3 indicating a slight rise.

The third catalyst illustrated in FIGURE 10, by lines 5 and 6, was prepared to contain 0.32 troy ounce of platinum impregnated in the presence of 3.47% by weight of citric acid, which amount is in excess of the upper limit imposed thereupon. The use of such an excess of organic acid produces a catalytic particle having the physical structure indicated by FIGURE 3, in which virtually all of the metallic component is forced into the center of the spherical particle. The "*k*" stability factors of this catalyst were substantially less than the standard reference catalyst, being 36.8 with respect to the hydrocarbon concentration and 48.7 in regard to carbon monoxide. The three catalysts represented by the data presented in FIGURE 10, were simultaneously tested in accordance with the catalyst evaluation test procedure. Therefore, a direct comparison of the three methods of catalyst manufacture may be made upon reference to FIGURE 10. It is readily ascertained that the utilization of an excess of the organic acid, or the use of the organic acid after the metallic component has been combined with the inorganic oxide particle, does not serve to attain the desired object of the present invention. This is very clearly illustrated in FIGURE 10, through the use of lines 1, 2, 5 and 6.

*Example VI*

Figure 11:
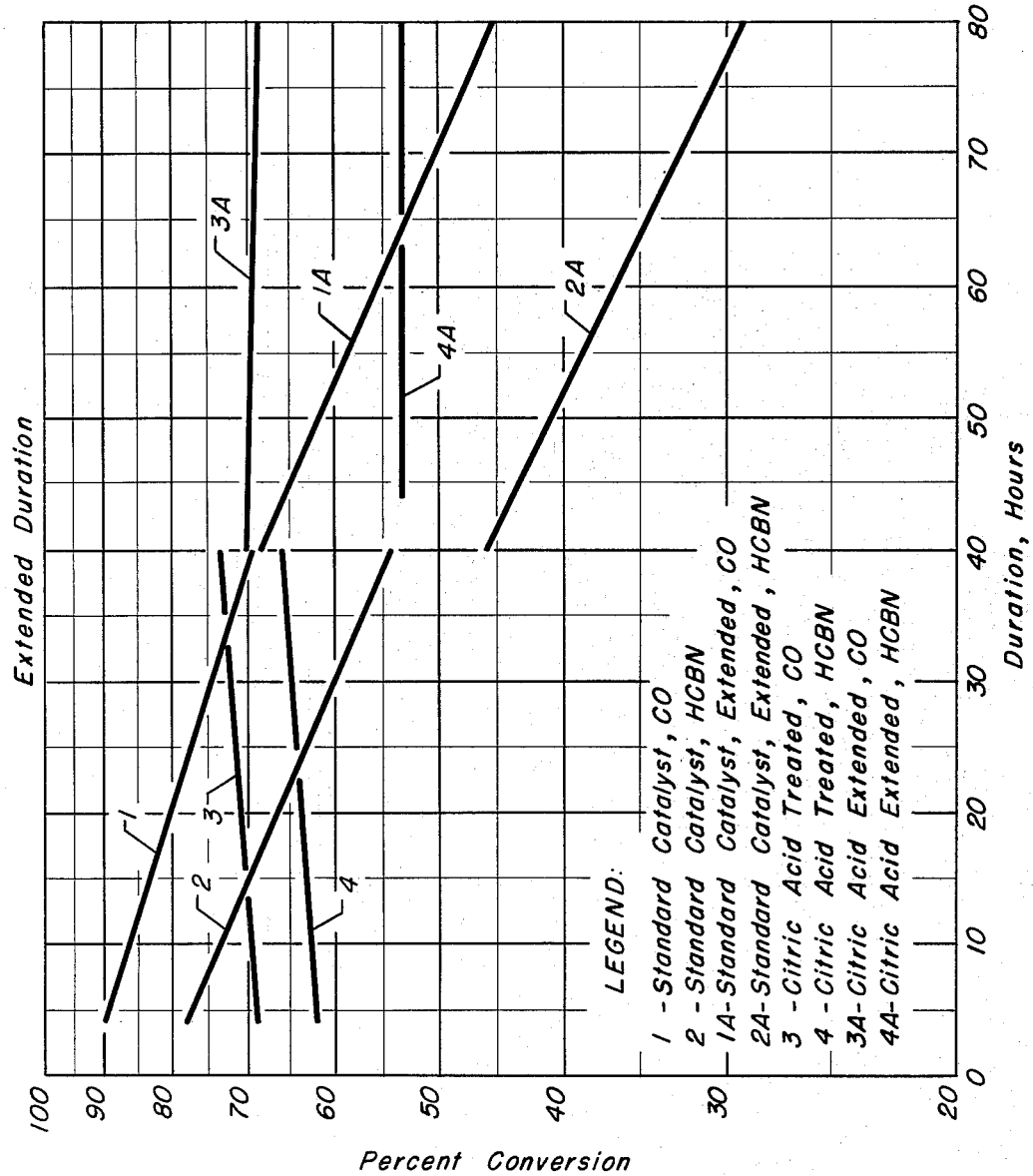

In this example, the results of which are illustrated in FIGURE 11, a direct comparison was made between the standard reference catalyst and a catalyst containing 0.51 troy ounce of platinum impregnated in the presence of 0.53% by weight of citric acid, based upon the weight of the alumina particles. The catalytic composites were simultaneously, but separately, subjected to the catalyst test evaluation procedure to determine the slope of the stability curve. These curves are indicated in FIGURE 11 in the following manner: line 1 is the carbon monoxide stability curve of the standard reference catalyst, line 2 represents the hydrocarbon stability curve; lines 3 and 4 represent the carbon monoxide and hydrocarbon stability curves respectively of the citric acid-treated catalyst. It is immediately noted that lines 3 and 4 both are characterized by having a positive slope, indicating an increase in stability with time. The citric acid-treated catalyst had a hydrocarbon "*k*" stability factor of 475.6+ compared to 125.5 for the standard reference catalyst, the carbon monoxide "k" stability factor was 289.3+ compared to 160.9 for the reference catalyst.

Following the first 40-hour test procedure, the catalytic composites were removed from the individual convertors for the purpose of inspecting the same. It was decided to extend the duration of the test procedure, with respect to these two catalysts, by re-loading the convertors, and subjecting the catalysts to a second 40-hour test procedure. The stability curves for the second 40-hour evaluation test are indicated by lines 1A and 2A, for the standard reference catalyst and lines 3A and 4A for the citric acid-treated catalyst. The break in these lines at the 40-hour duration results from the fact that the catalysts had been removed from the individual convertors to enable the visual inspection thereof. The importance of the data presented in FIGURE 11 resides in the fact that the extended stability curves from 40 to 80 hours indicates substantial continued improvement over the standard catalyst. It is of further interest to note that the improvement over the standard catalyst is greater at 80 hours than it was at the termination of the first 40-hour test procedure.

*Example VII*

Figure 12:
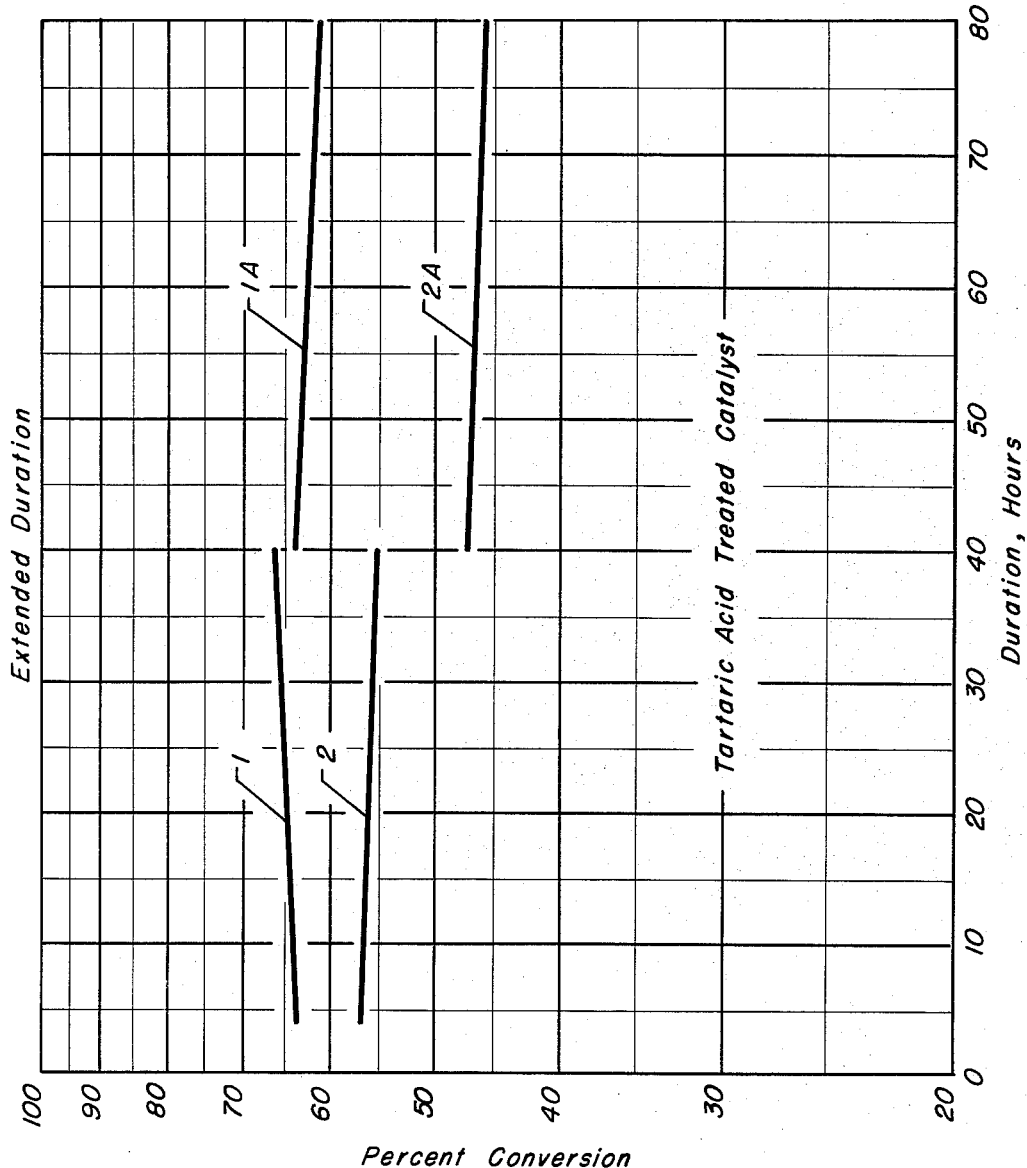

A catalyst was prepared to contain 0.32 troy ounce of platinum, impregnated within the alumina carrier material in the presence of 1.4 grams of tartaric acid per 150 grams of the alumina, or 0.93% by weight of tartaric acid. As illustrated in accompanying FIGURE 12, an extended duration stability test was made on this particular catalytic composite. In FIGURE 12, line 1 indicates the stability curve with respect to carbon monoxide, line 2 the stability curve with respect to the conversion of hydrocarbons, line 1A the continued stability curve with respect to carbon monoxide and 2A the continued stability curve with respect to the conversion of hydrocarbons. With respect to lines 1 and 2, the "*k*" stability factors for the tartaric acid-treated catalyst were 860.7+ and 242.1 respectively; the "*k*" stability factors for the standard reference catalytic composite were 189.5 and 110.7 respectively. This substantial improvement in stability was similarly pronounced during the extended period of 40 to 80 hours.

The foregoing examples present data which clearly indicate the benefits afforded through the use of a catalytic composite having the physical structure encompassed by the present invention, and prepared in accordance therewith. The utilization of a particular concentration of an organic acid, during the impregnation of the refractory inorganic oxide carrier material with the catalytically active metallic component, results in a catalytic composite having an unusually high and totally unexpected degree of stability with respect to the conversion or elimination of the noxious components contained within the exhaust gases from an automotive internal combustion engine, such that these exhaust gases may be discharged into the atmosphere with significantly less noxious characteristics.

I claim as my invention:

1. In the preparation of a particle-form catalytic composite including the step of impregnating an inorganic oxide carrier particle with a Group VIII metal component, the improvement in the method of effecting said impregnation so that said metal component is disposed essentially as a continuous layer interposed between the center and the surface of said particle which comprises using with said metal component from about 0.1% to about 1.5% by weight, based upon the weight of said carrier, of an organic acid in solution selected from the group consisting of dibasic acids and derivatives thereof having the following structural formula:

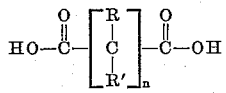

where:
R is selected from the group consisting of hydrogen, hydroxyl and alkyl groups;
R' is selected from the group consisting of hydrogen, alkyl and carboxyl groups; and
$n$ is within the range of 0 to 6;
said impregnation being effected in the absence of alkaline reagent.

2. The method of claim 1 wherein said inorganic oxide carrier is alumina and said metal component comprises a platinum-group metal.

3. The method of claim 2 wherein said acid is tartaric acid.

4. The method of claim 2 wherein said acid is citric acid.

5. In the preparation of a particle-form catalytic composite of alumina and a platinum component including the step of impregnating an alumina particle with a platinum compound, the improvement in the method of effecting said impregnation so that said platinum component is disposed essentially as a continuous layer interposed between the center and the surface of said particle which comprises using with said platinum compound from about 0.13% to about 0.70% by weight, based upon the weight of said alumina, of an organic acid in solution selected from the group consisting of dibasic acids and derivatives thereof having the following structural formula:

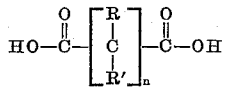

where:
R is selected from the group consisting of hydrogen, hydroxyl and alkyl groups;
R' is selected from the group consisting of hydrogen, alkyl and carboxyl groups; and
$n$ is within the range of 0 to 6;
said impregnation being effected in the absence of alkaline reagent.

6. A method of preparing a particle-form catalytic composite of alumina and a platinum component which comprises impregnating an alumina particle, in the absence of alkaline reagent, with a platinum compound and from about 0.13% to about 0.70% by weight, based upon the weight of said alumina, of an organic acid in solution selected from the group consisting of dibasic acids and derivatives thereof having the following structural formula:

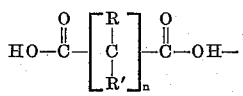

where:
R is selected from the group consisting of hydrogen, hydroxyl and alkyl groups;
R' is selected from the group consisting of hydrogen, alkyl and carboxyl groups; and
$n$ is within the range of 0 to 6;
drying the resulting impregnated particle at a temperature within the range of from about 100° F. to about 250° F., and thereafter subjecting the particle to an atmosphere of hydrogen at a temperature within the range of from about 900° F. to about 1800° F. to yield a platinum-containing particle in which said platinum component is disposed essentially as a continuous layer interposed between the center and the surface of said particle.

7. The method of claim 6 wherein said platinum compound is chloroplatinic acid.

References Cited by the Examiner
UNITED STATES PATENTS

| | | | |
|---|---|---|---|
| 2,746,936 | 5/1956 | Plank | 252—465 |
| 2,753,310 | 7/1956 | Riedl | 252—439 |
| 2,840,532 | 6/1958 | Haensel | 252—466 |
| 2,927,088 | 3/1960 | Michalko et al. | 252—466 |
| 2,948,672 | 8/1960 | Brennan | 252—466 X |
| 2,950,259 | 8/1960 | Starr, et al. | 252—466 |
| 2,965,583 | 12/1960 | Houdry et al. | 252—466 |
| 3,025,132 | 3/1962 | Innes | 23—2 |
| 3,067,002 | 12/1962 | Reid | 23—2 |
| 3,133,029 | 5/1964 | Hoekstra | 252—466 |

OSCAR R. VERTIZ, *Primary Examiner.*

MAURICE A. BRINDISI, BENJAMIN HENKIN,
*Eaxaminers.*

E. C. THOMAS, G. T. OZAKI, *Assistant Examiners.*